E. W. OHRT.
SPRING DAMPING MEANS FOR VALVE MECHANISM.
APPLICATION FILED JULY 31, 1919.

1,349,090.

Patented Aug. 10, 1920.

Inventor,
Emil W. Ohrt, by
G. C. Kennedy,
Attorney.

UNITED STATES PATENT OFFICE.

EMIL W. OHRT, OF REINBECK, IOWA.

SPRING DAMPING MEANS FOR VALVE MECHANISM.

1,349,090.  Specification of Letters Patent.  Patented Aug. 10, 1920.

Application filed July 31, 1919. Serial No. 314,448.

*To all whom it may concern:*

Be it known that I, EMIL W. OHRT, a citizen of the United States of America, and a resident of Reinbeck, Grundy county, Iowa, have invented certain new and useful Improvements in Spring Damping Means for Valve Mechanism, of which the following is a specification.

My invention relates to improvements in spring damping-means for valve-mechanism, and particularly to the valve-operating means for internal-combustion engines of the type employed on self-propelled vehicles, and the object of my improvement is to supply yieldable resilient means for creating tensions upon different parts of rocker-arms as associated movably with other elements of valve-operating means, to take up lost motion, keep such parts in proper working relations, and prevent unpleasant rattling and noises which would be otherwise caused by and due to the motions of the vehicle.

Figure 1:
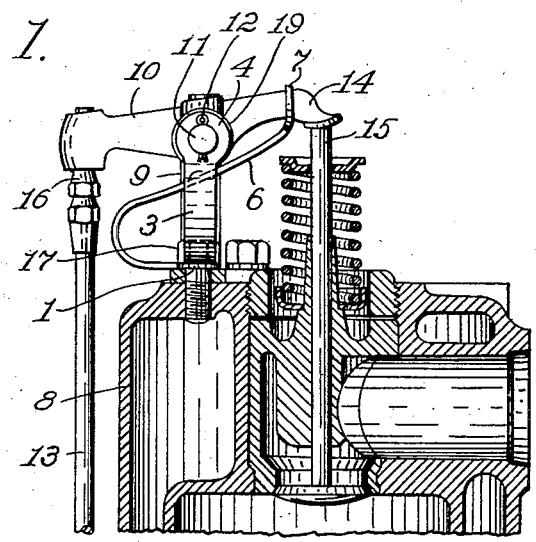
Figure 2:
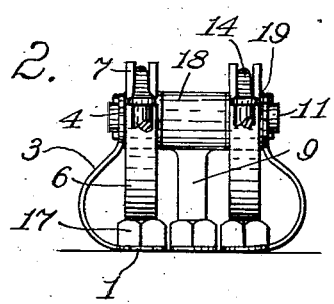
Figure 3:
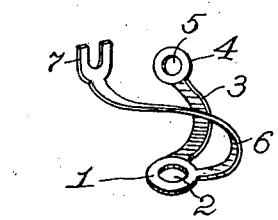

This object I have accomplished by the means which are hereinafter-described and claimed, and which are illustrated in the accompanying drawings, in which Figure 1 is a transverse vertical section through the upper part of an internal-combustion engine, with the valve-operating means in elevation, and my improved spring damping-means applied thereto; Fig. 2 is an elevation of the valve-operating means and said damping means, as viewed at an angle of ninety degrees from the elevation shown in said Fig. 1, and Fig. 3 is a perspective view of the spring damping-means alone.

In said drawings, similar numerals of reference denote corresponding parts throughout the several views.

The internal-combustion engine 8 is shown with a standard or bracket 9 detachably secured thereto by the hexagonal headed screws 17, and has a widened top part 18 supplied with a longitudinal bore to receive a pintle 11, the ends of the latter projecting sufficient distances to allow of mounting of the pair of rocker-arms 10 thereon.

End-parts 10 of said rocker-arms are enlarged and vertically bored to loosely receive the upper extremities of the cam-rods 13, cone-nuts 16 on said rods being engaged with said parts 10 to rock the latter upwardly in the usual manner.

The opposite parts 14 of said rocker-arms are also terminally widened suitably to engage the upper ends of the valve-rods 15. The rocker-arms are formed with flat circular bosses 19 and the ends of the pintle 11 extend beyond said bosses and are orificed to receive split-keys 12.

My improved spring damping-means is made of a single integral body, but may be composed of associated detachably-connected or contacted parts in its operating members.

The device is formed from metal shaped and tempered to provide curved spring-members 3 and 6, both integrally extending at a right-angle from each other with their junction circularly enlarged at 1 and provided with an orifice 2.

The arm or member 3 has a circularly enlarged bearing-head 4 provided with an orifice 5, and the outer end of the other spring-member 6 is shaped into a fork 7 opening upwardly.

In practice, these spring-dampers are applied to both rocker-arms, as shown in said Fig. 2. The junction-part of each device is secured to the engine by passing the stem of the screw 17 through its orifice 2, the head of the screw holding it tightly in place. The adjacent end of the pintle 11 is passed through the orifice 5 in the spring-member 4, the slit-key 12 securing the latter which bears against the boss 19 of the adjacent rocker-arm, whereby the pair of said spring-arms create opposite and coacting tensions to keep the rocker-arms in contact with the supporting bracket-head 18, taking up any looseness in the parts due to wear, and preventing rattling and noises.

The forks 7 of the other spring-members 6 pass upwardly about and receive the abutting parts of the rocker-arm parts 14, creating an upward tension thereupon, which in turn causes the extremity of the other rocker-arm member 10 to be held to its seat upon the cam-rod nut 16, thus preventing lost-motion there with incident noises.

As the valve-operating parts shown are subject to much wear and quickly get to rattling while the vehicle is in rapid motion, my device obviates the inconveniences which would otherwise be caused thereby.

Having described my invention, what I claim as new, and desire to secure by Letters Patent, is:

1. In combination, supporting-means, rocker-arms mounted on opposite sides thereof, and like spring tension-devices having like members bearing upon the rocker-arms to exert opposite tensions thereon to keep them in contact with said supporting-means, and also having like members bearing upon and engaged with like extremities of the rocker-arms at one side to exert tensions thereon in a certain direction.

2. The combination with supporting-means, and a rocker-arm medially mounted thereon, of a spring-device comprising integrally-connected spring-arms extending from each other at an angle and respectively shaped to bear upon and engage different parts of the rocker-arm to exert thereon resilient tensions in different directions.

Signed at Waterloo, Iowa, this 14th day of July, 1919.

EMIL W. OHRT.